Nov. 9, 1954   R. A. FINDLAY   2,694,038
METHOD FOR MANUFACTURING COKE
Filed July 10, 1950
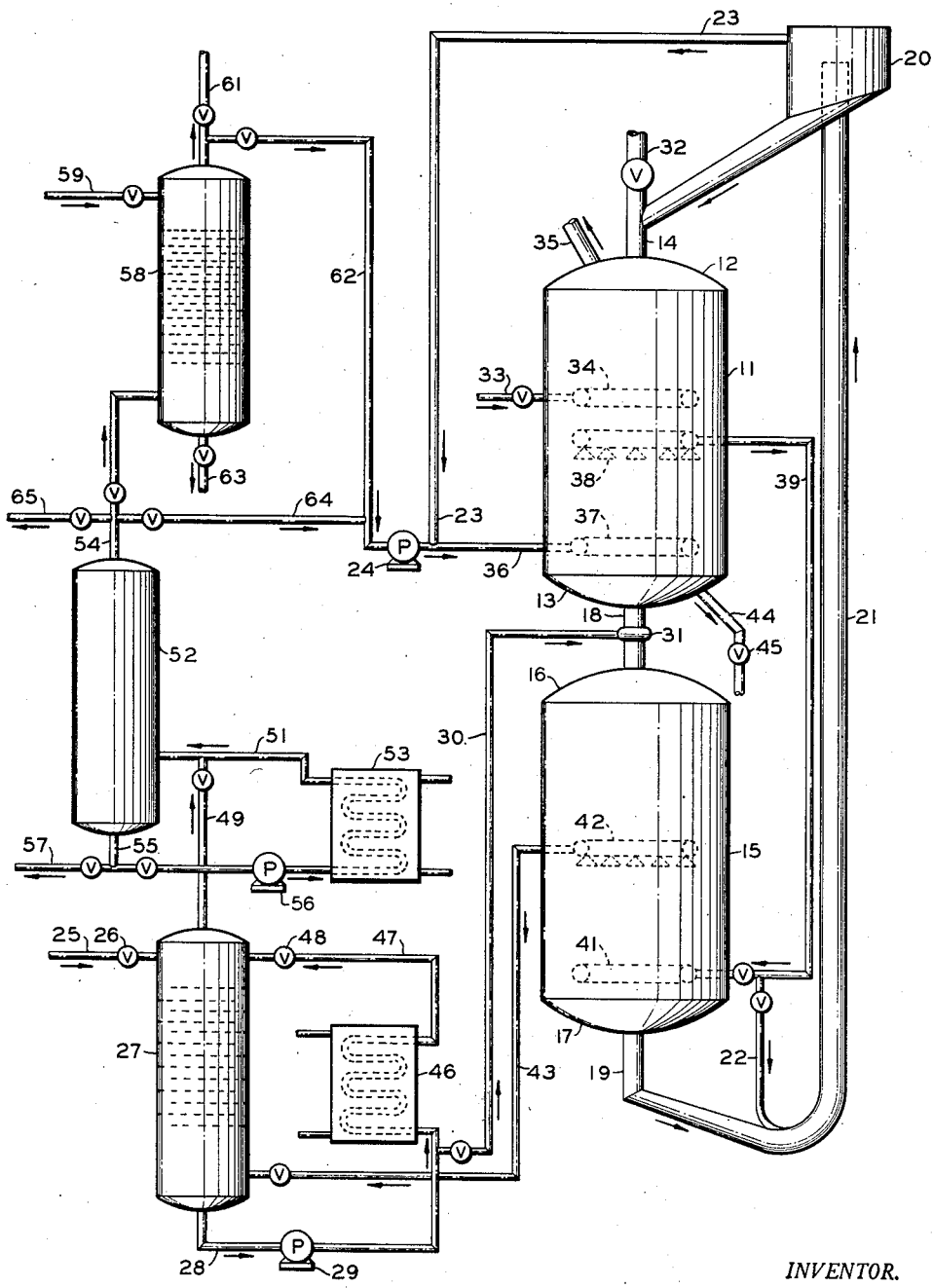
INVENTOR.
R. A. FINDLAY
BY *Hudson and Young*
ATTORNEYS United States Patent Office 2,694,038
Patented Nov. 9, 1954

2,694,038

METHOD FOR MANUFACTURING COKE

Robert A. Findlay, Bartlesville, Okla., assignor to Phillips Petroleum Company, a corporation of Delaware Application July 10, 1950, Serial No. 172,883

7 Claims. (Cl. 202—23)

This invention relates to the manufacture of high grade coke. In one of its more specific aspects, it relates to an improved process for the continuous manufacture of high grade coke. In another of its more specific aspects, it relates to an improved system for the production of high grade coke and the recovery of hydrocarbon by-products.

High grade coke, which is utilized for the production of electrodes and the like, must necessarily be substantially free of volatile matter and undesirable impurities, such as sulfur. Another requirement for such coke is that it be dry and non-tacky. I have devised a system and method whereby a high grade coke having properties set forth above can be continuously and economically produced.

An object of this invention is to provide an improved process for manufacturing a dry, calcined coke. Another object of this invention is to provide a process for continuously manufacturing a dry, calcined coke which is substantially free of volatile matter. Another object of the invention is to provide an improved system for converting hydrocarbon oil fractions to coke and for recovering hydrocarbon by-products resulting therefrom. Other and further objects and advantages will be apparent to those skilled in the art upon study of the accompanying disclosure and drawings.

Better understanding of the invention will be obtained upon reference to the drawing which is a diagrammatic representation of the system preferred for the production of high grade coke by the process of this invention.

In the drawing, upright chamber 11 is closed at its upper and lower ends by closure members 12 and 13, respectively. Coke material inlet conduit 14 is provided in the upper end of chamber 11, preferably in closure member 12. Disposed below chamber 11 is a second upright chamber 15 which is closed at its upper and lower ends by closure members 16 and 17, respectively. Solid material conduit 18 extends between closure member 13 in the bottom of chamber 11 and closure member 16 in the top of chamber 15, providing a passage for solid material from the bottom of chamber 11 to the upper portion of chamber 15. Solid material outlet conduit 19 is provided in the lower portion of chamber 15, preferably in bottom closure 17. Conduit 19 extends between chamber 15 and the lower portion of elevator 21 which may be a mechanical bucket type elevator, but is preferably a gas lift type elevator. Elevator 21 is connected at its upper end portion with the inlet end of conduit 14 which extends upwardly from the top of chamber 11.

When elevator 21 is a gas lift type elevator, a portion of the hot gas from conduit 39, which is pressurized by a pressurizing means such as blower 24 in conduit 36, is diverted through conduit 22 to conduit 19. The coke particles which are elevated from the lower portion of chamber 15 are separated from the entraining gas in separator 20 and are gravitated into the upper portion of chamber 11. The entraining gas is recycled through conduit 23 to conduit 36.

Hydrocarbon oil is introduced through conduit 25 and valve 26 into separator 27. That oil may be any oil suitable for the purpose but this process is particularly suitable for converting a hydrocarbon residuum material. The oil flows downwardly over the trays within separator 27, through conduit 28 and pump 29 and is introduced into solid material conduit 18 through header member 31.

Coke which is initially introduced into the system through conduits 32 and 14 for start-up of the system is gravitated through chamber 11 as a contiguous coke mass. Heating material, such as a hot combustion gas or a hydrocarbon fuel and air, is introduced into an intermediate portion of chamber 11 through conduit 33 and inlet header 34. If the heating material is a hydrocarbon fuel and air, the fuel is burned on the surface of the coke particles and the resulting hot combustion gases are passed upwardly through the upper portion of the contiguous coke mass within a heating zone in chamber 11, countercurrent to the flow of the coke and in direct heat exchange therewith. If a hot combustion gas is initially introduced into the heating zone of chamber 11 through conduit 33, that gas is contacted with the coke particles in the same manner. That gaseous heat exchange material is removed from the upper portion of chamber 11 through gaseous effluent conduit 35. The coke particles within the heating zone are raised to a temperature within the range of 2200° F. to 2400° F.

A cool gas, such as methane or hydrogen, preferably obtained by recovery of hydrocarbon products from the coke producing system, is introduced into a cooling zone in the lower portion of chamber 11 through conduit 36 and header member 37. The cooling gas flows upwardly through the gravitating contiguous coke mass in direct heat exchange therewith and cools the coke material while removing sulfur from the coke at a temperature preferably within the range of 1800° F. to 2200° F. The removal of sulfur is effected by reduction with the cooling gas. The cooling gas, which is heated to a temperature within the range of between 1800° F. and 2200° F. in the cooling zone, is collected in gaseous material collector means 38 at the upper end of the cooling zone and is passed by means of conduit 39 to the lower portion of chamber 15 and is introduced into a heating zone therein and into direct contact with the gravitating coke particles in chamber 15 through header member 41, preferably at a temperature within the range of between 1700° F. and 1900° F.

A portion of the cooled coke from chamber 11 is gravitated through conduit 18 into a reaction zone in the upper portion of chamber 15. The coke is coated with hydrocarbon oil from conduit 30 and header 31. The coke particles supply enough heat to the oil to cause vaporization and cracking of a portion of the oil. The coke particles are introduced into the upper portion of chamber 15 at a temperature within the range of 1000° F. and 1600°F. A portion of the hydrocarbon oil is immediately converted to coke on the surface of the coke particles. The cracked and vaporized oil materials which are not converted to coke are caused to flow concurrently through the reaction zone in the upper portion of chamber 15 together with the gravitating coke particles. Considerable coking of the hydrocarbon materials on the gravitating coke particles is obtained by means of this intimate contact during the concurrent flow. The other gas or gases, which are introduced into chamber 15 through conduit 39 and header member 41, aid in the cracking and coking of the remainder or unconverted oil material in the upper portion of the heating zone in chamber 15. Gaseous and vaporous hydrocarbons are collected at a point intermediate the reaction and heating zones in chamber 15 by collector member 42 and are withdrawn from chamber 15 through conduit 43. The coke particles, which have been coated with additional coke by the conversion within chamber 15, are withdrawn from chamber 15 through conduit 19 and are elevated by means of elevator 21 to the heating zone in the upper portion of chamber 11 in which they are calcined. The sulfur is removed from the coke particles by reduction in the lower portion or cooling zone of chamber 11. A portion of the coke particles is continuously withdrawn from the lower end of chamber 11 through conduit 44 and valve 45 as coke products. The coke products are cooled by cooling means, not shown.

Collectors members 38 and 42 may be any type of device which will provide disengaging spaces in the coke material so as to facilitate the collection of the gaseous effluent. Elongated inverted V-members such as are diagrammatically shown in the drawing provide the desired void space within the coke beds.

The gaseous and vaporous reaction products from chamber 15 are passed by means of conduit 43 into the lower portion of separator 27 and are caused to pass upwardly through that chamber countercurrent to the downflowing oil which is used as the feed for the coke manufacture process. Vaporous products are condensed by contact with the cool oil stream and are separated from the uncondensed products. The condensed products flow downwardly through separator 27 with the oil. A portion of that combined stream is passed through cooler 46 where the oil and products are further cooled and is reintroduced into the upper portion of separator 27 through conduit 47 and valve 48. The balance of the oil and product stream is diverted through conduit 30 and is dispersed on the surface of solid coke material, preferably in conduit 18 through header member 31.

The uncondensed product stream is removed from the upper portion of separator 27 through conduit 49 and is combined with a liquid recycle stream flowing through conduit 51 and is introduced into an intermediate portion of stripper chamber 52. The liquid recycle stream, which flows through conduit 51, is cooled in cooler 53 and reduces the temperature of the product stream to such an extent that further condensation of the product is obtained. Uncondensed materials are removed from the stripper chamber 52 through conduit 54 and the condensed material is removed from stripper chamber 52 through conduit 55. The liquid product, which comprises to a large extent a light gasoline fraction, is utilized as a recycle stream through pump 56 and cooler 53. A portion of that liquid product is withdrawn from the system through conduit 57.

In a preferred step, the uncondensed product stream is introduced by means of conduit 54 into the lower portion of absorber chamber 58. A lean absorption oil, such as mineral seal oil, is introduced into the upper portion of absorber chamber 58 through conduit 59 and flows downwardly through the absorber chamber countercurrent to the flow of the uncondensed product stream. Dry gases, such as methane and hydrogen, are removed as gaseous effluent from the upper portion of absorber 58 through conduit 61. A portion of that gas stream is utilized as the cooling and reducing gas in the lower portion of chamber 11. That portion of the gas stream is passed by means of conduit 62 to conduit 36 through which it is introduced into chamber 11. The rich absorption oil is removed from the lower portion of absorber chamber 58 through conduit 63, stripped in a conventional stripper (not shown), and returned to the absorber 58 via line 59. Any portion of the dry gas effluent which is not utilized for recycle to chamber 11 is passed to a distribution point, not shown.

At times it may not be necessary or desirable to remove all condensible materials from the product gas reintroduced into chamber 11. Under such conditions, absorber 58 may be eliminated from the system. In that event, a portion of the gaseous effluent from stripper 52 is passed by means of conduit 64 to conduit 36 for reintroduction into chamber 11 and the balance of the gaseous stream is passed to a distribution point, not shown, through conduit 65.

Coke which is produced by reaction of the hydrocarbon oil in chamber 15 is not as hard nor as free from impurity as the high grade coke product desired. When that coke is elevated to the upper portion of chamber 11 and is calcined at a temperature within the range 2200° F. to 2400° F., substantially all of the volatile matter is removed from the product and an increase in fixed carbon is obtained. Further improvement in the quality of the coke is obtained in the cooling zone of chamber 11 by the removal of sulfur from the coke in the manner described above. Cokes which are removed from the two chambers have properties which are generally found within the range set forth below in the table.

Table

| Weight Percent | Lower Chamber | Upper Chamber |
|---|---|---|
| Volatile Material | 4–10 | 0.0–0.6 |
| Fixed Carbon | 02–96 | 96–99 |
| Ash | 0.2–1.3 | 0.3–1.5 |
| Sulfur | 1.0–4.0 | 0.5–1.0 |

The improvement in the quality of coke obtained by the process of this invention is quite obvious upon consideration of the data set forth in the table above. By the system of this invention, the quality of the coke products is materially improved and at the same time desirable hydrocarbon products are obtained from the reaction system.

Many other modifications of this process will be apparent to those skilled in the art upon study of the accompanying disclosure. It is believed that such modifications are clearly within the spirit and the scope of this disclosure.

I claim:

1. A method for converting a hydrocarbon oil to form coke in a continuous conversion system which comprises in combination the steps of heating coke particles in a first heating zone; gravitating said heated coke particles from said first heating zone through a cooling zone to a reaction zone; passing a relatively cool gas into direct heat exchange with said coke particles in the lower portion of said cooling zone and counter to the flow of said gravitating heated coke particles therein; coating said heated coke particles with hydrocarbon oil intermediate said cooling zone and said reaction zone; bringing said hydrocarbon oil to reaction temperature and converting a portion thereof to coke on said coke particles by direct heat exchange with said heated coke particles; gravitating said coke particles from said reaction zone to a second heating zone; passing gaseous effluent from the upper portion of said cooling zone into the lower portion of said second heating zone so that previously unreacted hydrocarbon materials are reacted and stripped from said coke particles; removing gaseous effluent from the upper portion of said second heating zone and resulting gaseous reaction products from the lower portion of said reaction zone; gravitating said coke particles from said second heating zone; elevating said coke particles to said first heating zone; calcining said coke particles in said first heating zone; and withdrawing a portion of said calcined coke particles from the bottom of said cooling zone.

2. The method of claim 1, wherein any sulfur in said calcined coke particles is at least partially removed by cooling said coke particles intermediate said first heating zone and said reaction zone with a reducing gas.

3. The method of claim 2, wherein said coke is calcined at a temperature within the range of 2200° F. to 2400° F.

4. The method of claim 3, wherein said calcined coke is cooled by contacting it with said reducing gas to a temperature within the range of 1800° F. to 2200° F.

5. A method for converting a hydrocarbon oil to form coke in a continuous conversion system which comprises in combination the steps of heating coke particles by passing hot gaseous heat exchange material through a first heating zone counter to the flow of said coke particles so as to maintain the temperature of said first heating zone within the range of 2200° F. to 2400° F.; removing gaseous effluent from the upper portion of said first heating zone; gravitating said heated coke particles from said first heating zone through a cooling zone to a reaction zone; passing a relatively cool gas into direct heat exchange with said coke particles in the lower portion of said cooling zone and counter to the flow of said gravitating coke particles therein so as to maintain said cooling zone at a temperature with the range of 1800° F. to 2200° F.; coating said heated coke particles with hydrocarbon oil intermediate said cooling zone and said reaction zone; bringing said hydrocarbon oil to a reaction temperature within the range between 1000° F. and 1600° F. in direct heat exchange with said coke particles and converting a portion thereof to coke on said coke particles in said reaction zone; removing resulting gaseous reaction products from the lower portion of said reaction zone; gravitating said coke particles from said reaction zone to a second heating zone; passing gaseous effluent from the upper portion of said cooling zone into the lower portion of said second heating zone at such a rate and temperature that said second heating zone is maintained at a temperature within the range of 1700° F. to 1900° F. and previously unreacted hydrocarbon materials are reacted and stripped from said coke particles; removing gaseous effluent from the upper portion of said second heating zone in a stream common with said reaction products from said reaction zone; gravitating said coke particles from said second heating zone; elevating said coke particles to said first heating zone; calcining said coke particles in said first heating zone; and withdrawing a portion of said calcined coke particles from the bottom of said cooling zone.

6. The method of claim 5, wherein dry methane and hydrogen are recovered from reaction products resulting from the conversion of said hydrocarbon oil; passing said methane and hydrogen into the lower portion of said cooling zone; and removing at least a portion of any sulfur content from said coke particles by reduction thereof with said methane and hydrogen.

7. The method of claim 6, wherein a portion of said methane and hydrogen from said cooling zone is utilized to entrain and elevate coke particles from said second heating zone to said first heating zone.

References Cited in the file of this patent

UNITED STATES PATENTS

| Number | Name | Date |
| --- | --- | --- |
| 1,509,667 | Catlin | Sept. 23, 1924 |
| 1,551,956 | Hubmann | Sept. 1, 1925 |
| 1,674,420 | Trumble | June 19, 1928 |
| 1,690,933 | Hubmann | Nov. 6, 1928 |
| 1,690,935 | Hubmann | Nov. 6, 1928 |
| 2,131,702 | Berry | Sept. 27, 1938 |
| 2,407,700 | Huff | Sept. 17, 1946 |
| 2,456,796 | Schutte | Dec. 21, 1948 |
| 2,459,096 | Ray | Jan. 11, 1949 |
| 2,461,104 | Bates | Feb. 8, 1949 |
| 2,508,993 | Crowley | May 23, 1950 |
| 2,526,696 | Schutte | Oct. 24, 1950 |
| 2,600,078 | Schutte et al. | June 10, 1952 |
| 2,639,263 | Leffer | May 19, 1953 |

OTHER REFERENCES

Brewer et al., "Desulfurization of Coal During Carbonization With Added Gases," Ind. & Eng. Chem., vol. 41. (1949), pp. 2044–2053.